United States Patent
Shafer

(10) Patent No.: US 8,291,506 B2
(45) Date of Patent: Oct. 16, 2012

(54) PROTECTING CONFIGURATION DATA IN A NETWORK DEVICE

(75) Inventor: Philip A. Shafer, Raleigh, NC (US)

(73) Assignee: Juniper Networks, Inc., Sunnyvale, CA (US)

( * ) Notice: Subject to any disclaimer, the term of this patent is extended or adjusted under 35 U.S.C. 154(b) by 305 days.

(21) Appl. No.: 12/709,881

(22) Filed: Feb. 22, 2010

(65) Prior Publication Data

US 2011/0209203 A1   Aug. 25, 2011

(51) Int. Cl.
*H04L 29/06* (2006.01)
*G06F 17/00* (2006.01)
*G06F 7/04* (2006.01)
*G06F 15/16* (2006.01)
*G06F 17/30* (2006.01)
*H04N 7/16* (2011.01)

(52) U.S. Cl. .................. 726/27; 726/1; 726/6; 709/220; 709/224; 709/225

(58) Field of Classification Search ........................ None
See application file for complete search history.

(56) References Cited

U.S. PATENT DOCUMENTS

| | | | | |
|---|---|---|---|---|
| 6,934,853 | B2 * | 8/2005 | Christopherson et al. | 726/6 |
| 7,565,416 | B1 * | 7/2009 | Shafer et al. | 709/220 |
| 7,634,551 | B2 * | 12/2009 | Tredoux et al. | 709/220 |
| 7,747,738 | B2 * | 6/2010 | Ellisor, Jr. | 709/224 |
| 7,757,213 | B2 * | 7/2010 | Fusaro et al. | 717/120 |
| 7,757,276 | B1 * | 7/2010 | Lear | 726/6 |
| 7,882,540 | B2 * | 2/2011 | Lingafelt et al. | 726/1 |
| 8,086,733 | B2 * | 12/2011 | Fujita et al. | 709/225 |

* cited by examiner

*Primary Examiner* — Shin-Hon Chen
(74) *Attorney, Agent, or Firm* — Harrity & Harrity, LLP

(57) ABSTRACT

Configuration information for a network device may be associated with a protection state that may restrict the modification of portions of the configuration information that are set to the protected state. The network device may be configured using configuration information defined as a group of hierarchically arranged configuration statements. Permissions may be stored for the network device relating to users permitted to modify the configuration information. The permissions may include permission tags, or other information defining the protection state, associated with the configuration statements. Intended modifications to the configuration information may be processed based on whether the intended modifications affect configuration statements associated with one of the permission tags.

24 Claims, 7 Drawing Sheets

```
protocols {
    ospf {
        area 0.0.0.0 {
            interface so-0/0/0 {
                hello-interval 5;
            }
            interface so-0/0/1 {
                hello-interval 10;
            }
        }
    }
}
```

PROTECTING CONFIGURATION DATA IN A NETWORK DEVICE

BACKGROUND

A network device, such as a router, switch, or security device, may perform a variety of functions relating to enabling a network. A router or switch, for instance, may operate to forward data units, such as packets, through the network so that the packets reach the intended destination. A network security device, such as a firewall, may operate to enforce network security and access management policies in the network. Some network devices may perform multiple network functions, such as a network device that performs both routing and switching functions or a network device that performs routing and security functions.

Operators of a network device frequently need to configure the network device for the particular application in which the network device is to be used. In some situations, the operator of the network device may be a corporation or other entity in which many different users are authorized to change different aspects of the configuration information for the network device. Software applications may also change the configuration information of a network device.

Many parts of the configuration information for a network device can be relatively sensitive to changes. To assist operators in managing changes to the configuration information, the network device may provide permissions that can be used to limit the changes that a particular user can make. It is desirable that the ability to set permissions for the network device be flexible and easy to use while also providing a high level of functionality in setting the permissions.

SUMMARY

One implementation is directed to a network device that may include a user interface component to provide an interface to users of the network device for viewing and modifying configuration information associated with the network device. The configuration information for the network device may be defined as a plurality of hierarchically arranged configuration statements. The network device may also include a permission management component to store permissions relating to users permitted to modify the configuration information, the permissions including permission tags associated with one or more of the configuration statements. The permission management component may further receive intended modifications to the configuration statements, determine whether the intended modifications affect configuration statements associated with one of the permission tags, and output, when the intended modifications affect configuration statements associated with one or more of the permission tags, an indication that the configuration statements associated with the permission tags are protected.

Another implementation is directed to a method that may include receiving, by a network device, a command to place the network device in a configuration mode in which configuration information for the network device is modifiable, the configuration information being defined based on a group of configuration statements. The method may further include associating, by the network device and in response to a first command, one or more of the plurality of configuration statements with a protected state; receiving, by the network device, a second command to modify one of the plurality of configuration statements of the network device; determining, by the network device and in response to the second command, whether the one of the plurality of configuration statements that is to be modified is associated with the protected state; and denying, by the network device, when the one of the plurality of configuration statements is associated with the protected state, modification of the one of the plurality of configuration statements.

In yet another implementation, a network device includes an input port; an output port; and a hardware component to process data units received by the input port and to transmit the processed data units from the output port, the hardware component being associated with configuration information defined based on a plurality of configuration statements. The network device may further include a processor; and a memory including instructions, that when executed by the processor, cause the processor to: associate, in response to a command from a user, a configuration statement with a protected state that indicates that the configuration statement should not be modified; receive a first command to modify the configuration statement; deny the modification to the configuration statement when the configuration statement is associated with the protected state; receive a second command to remove the protected state associated with the configuration statement; and remove, in response to the second command, the protected state associated with the configuration statement.

In yet another implementation, a device may include means for receiving a command to place the device in a configuration mode in which configuration information for the device is modifiable, the configuration information being defined based on a group of hierarchically arranged configuration statements; means for receiving a command to associate one or more of the group of configuration statements with permission tags; means for receiving a command to modify one of the group of configuration statements of the device; means for determining whether the one of the group of configuration statements that is to be modified is associated with one of the permission tags; and means for denying, when the one of the group of configuration statements is associated with one of the permission tags, modification of the one of the group of configuration statements.

BRIEF DESCRIPTION OF THE DRAWINGS

The accompanying drawings, which are incorporated in and constitute a part of this specification, illustrate one or more embodiments described here and, together with the description, explain these embodiments. In the drawings:

FIG. 3B is a diagram illustrating an exemplary interface representing configuration data for a network device;

DETAILED DESCRIPTION

The following detailed description of the invention refers to the accompanying drawings. The same reference numbers in different drawings may identify the same or similar elements. Also, the following detailed description does not limit the invention.

As described herein, configuration information in a network device may be associated with a protection state, that may restrict the modification of portions of the configuration information that are set to the protected state. Commands may be used to set and remove the protection state from portions of the configuration information. An additional command may be used to specify which users are allowed to remove the protection state. If configuration information associated with a protection state is to be modified, the user may first be required to remove the protection state corresponding to the configuration information. Requiring a user to explicitly remove the protection state, before modifying the configuration of the network device, makes inadvertent modification of the network device less likely.

In the embodiments particularly described herein, the configuration information for the network device will be described as a hierarchical set of configuration statements. In alternative implementations, however, the configuration information for the network device may be specified using a different terminology and may be differently structured (e.g., a non-hierarchical set of statements). Additionally, as particularly described herein, the protection state for the configuration statements is described as being implemented through textual "tags" that can be applied and removed from the statements. In alternative implementations, however, other techniques for storing and presenting the protection state for the configuration information may be used.

Exemplary System Overview

Figure 1:
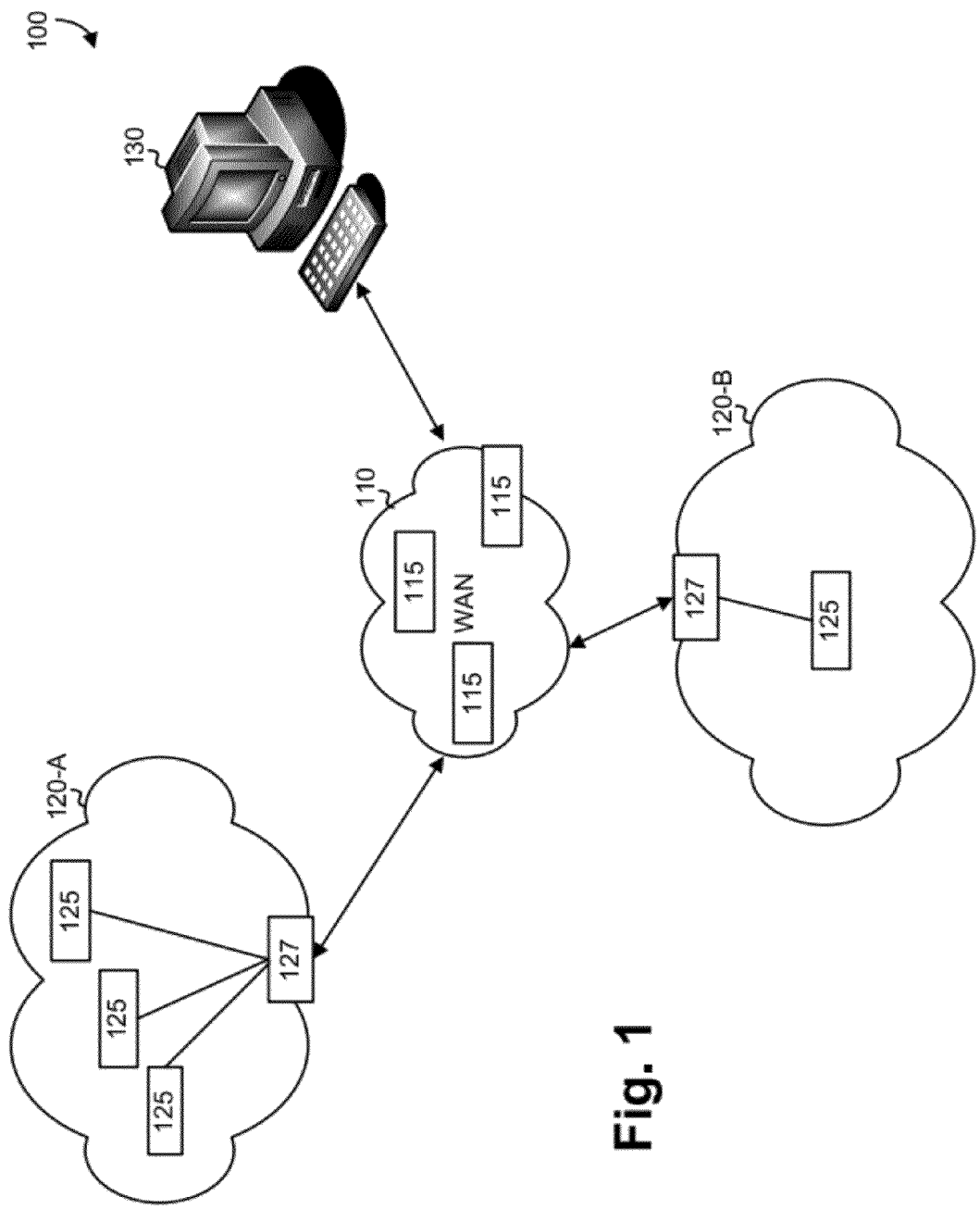
FIG. 1 is a diagram of an exemplary system in which concepts described herein may be implemented.

FIG. 1 is a diagram of an exemplary system 100 in which concepts described herein may be implemented. System 100 may include a wide area network (WAN) 110 connected to one or more private networks 120-A and 120-B (collectively referred to as private networks 120) and a computing device 130. Private networks 120 may each, for example, include corporate or individual local area networks (LANs).

WAN 110 may generally include one or more types of networks. For instance, WAN 110 may include a cellular network, a satellite network, the Internet, or a combination of these (or other) networks that are used to transport data. Although shown as a single element in FIG. 1, WAN 110 may include a number of separate networks that function to provide services to private networks 120 and computing devices, such as computing device 130. WAN 110 may be implemented using a number of network devices 115. Network devices 115 may include, for example, routers, switches, gateways, and/or other devices that are used to implement WAN 110.

Private networks 120 may each include a number of computing devices, such as, for example, client computing stations 125 and network devices 127. Client computing stations 125 may include computing devices of end-users, such as desktop computers or laptops. Network devices 127, similar to network devices 115, may include network devices used to implement private networks 120, such as firewalls, network acceleration devices, switches, routers, combinations of these devices, or other devices relating to network implementation, control, and/or security.

Network devices 115 and 127 may each implement a network operating system that controls the resources of the network device and provides an interface to the network device through which users can modify the configuration of the network device. For example, network devices 115 and 127 may provide a command-line interface (CLI) through which users may configure, troubleshoot, and monitor the operation of network devices 115 and 127. In alternative implementations, other interface types, such as a graphical interface, may be presented by the network operating system to configure the network device.

Computing device 130 may include, for example, a laptop or personal computer connected to WAN 110. Alternatively, computing device 130 may include a mobile device, such as a cell phone, etc.

In the exemplary system shown in FIG. 1, two private networks 120-A and 120-B and one computing device 130 are shown. In other implementations, system 100 may include additional, fewer, different, or differently arranged networks and/or devices. Additionally, in some implementations, tasks described as being performed by one device in FIG. 1 may be performed by a different one or more devices in FIG. 1.

Exemplary Device Architecture

Figure 2:
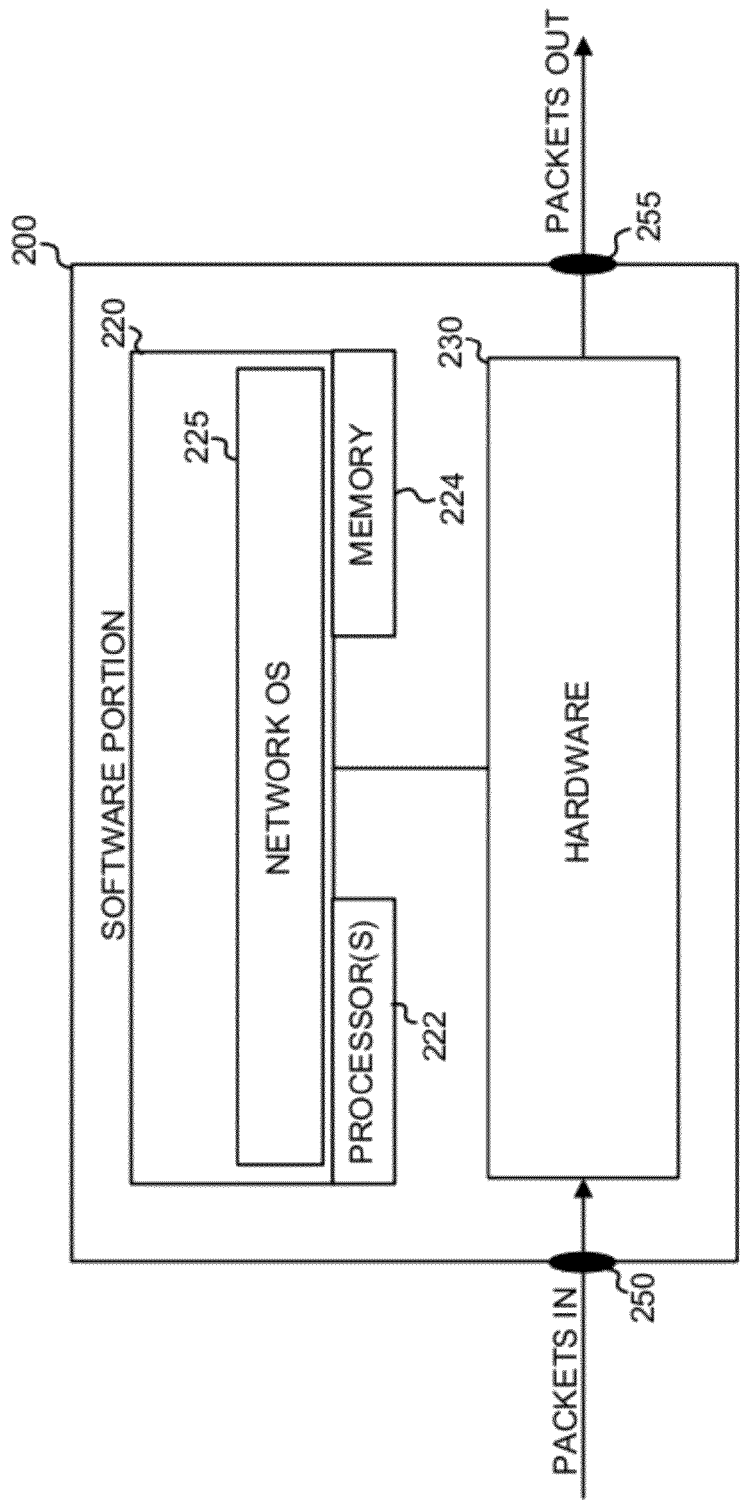
FIG. 2 is a block diagram of an exemplary network device corresponding to a network device shown in FIG. 1.

FIG. 2 is a block diagram of an exemplary network device 200, which may correspond to one of network devices 115 or 127. In order to increase throughput, network device 200 may use dedicated hardware to assist in processing incoming units of data, such as packets. In some alternative implementations, units of data (data units) other than packets may be used. As shown in FIG. 2, network device 200 may generally include a software portion 220 and a hardware portion 230.

Software portion 220 may include software designed to control network device 200. Software portion 220 may particularly include network operating system 225. For example, network operating system 225 may control hardware portion 230 and may provide an interface for user configuration of network device 200. In general, software portion 220 may implement the functions of the network device that are not time critical. The functions described as being performed by software portion 220, may be implemented through, for example, one or more general purpose processors 222 and one or more computer memories 224. Processors 222 may include processors, microprocessors, or other types of processing logic that may interpret and execute instructions. Computer memories 224 (also referred to as computer-readable media herein) may include random access memories (RAMs), read-only memories (ROMs), and/or other types of dynamic or static storage devices that may store information and instructions for execution by one or more processors 222.

Hardware portion 230 may include circuitry for efficiently processing packets received by network device 200. Hardware portion 230 may include, for example, logic, such as an application specific integrated circuit (ASIC), a field programmable gate array (FPGA), and/or a content-addressable memory (CAM). When network device 200 is a router, hardware portion 230 may, for example, receive incoming packets, extract header information for the packets, and process the packets based on the extracted header information. When network device is a firewall, hardware portion 230 may, for example, receive incoming packets, extract header information from the packets, and match portions of the header information to a lookup table, such as one stored in a ternary content addressable memory, to determine whether the packet should be dropped.

Network device 200 may additionally include one or more input ports 250 for receiving incoming packets and one or more output ports 255 for transmitting an outgoing packet. In some implementations, a port may act as both or one of an input port 250 or an output port 255. Ports 250/255 may also be used to receive remote user connections for configuring the operation of network device 200.

Although network device 200 is shown as including a software portion 220 and a hardware portion 230, network device 200 may, in some implementations, be implemented entirely through hardware. Additionally, network device 200 may include additional, fewer, different, or differently arranged components than those illustrated.

Network Device Configuration Information

As previously mentioned, network device 200 may be associated with configuration information that controls the operation of network device 200, such as the operation of hardware portion 230. In one implementation, the configuration information may be specified by a hierarchy of "statements," where each statement may relate to a particular aspect of the operation of network device 200. As an example of the hierarchical nature of the statements, consider a router that includes a top-level statement "protocol." Below the protocol statement may be a number of statements relating to configuration of various protocols supported by the router, such as an "ospf" statement (open shortest path first) and a "bgp" statement (border gateway protocol). Each of these statements may include additional lower-level statements or "leaf" statements. A leaf statement may refer to a statement that does not contain additional statements. A leaf statement may be associated with configurable values that define the leaf statement.

Although a hierarchy of statements will be described herein as being used to configure network device 200, in other implementations, other possible techniques could be used to configure network device 200.

Figure 3A:
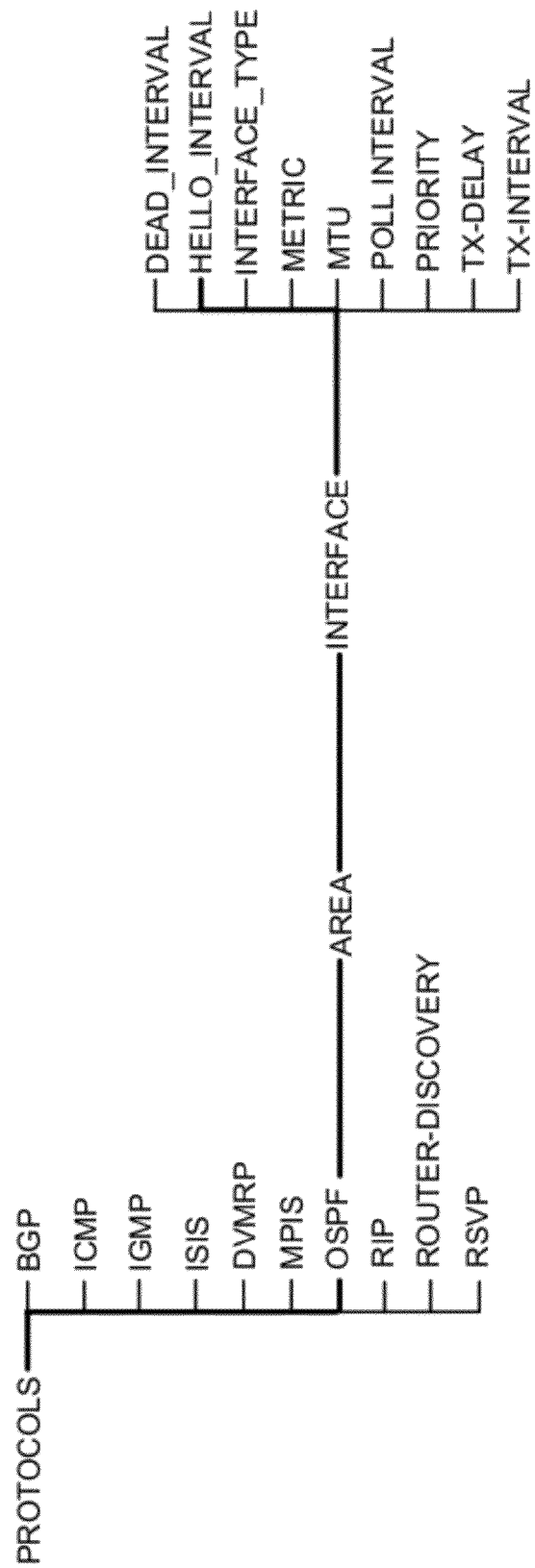
FIG. 3A is a diagram illustrating an exemplary hierarchy of configuration statements that may define configuration information for a network device.

FIG. 3A is a diagram illustrating an exemplary hierarchy of configuration statements that may define configuration information for a network device. In the example of FIG. 3A, the top-level level statement is "protocols," which may be a statement containing a number of statements that are used to configure protocols implemented by network device 200. The "protocols" statement may contain a number of child statements. In the example of FIG. 3A, each child statement is a statement relating to a specific protocol, such as "bgp," "icmp," etc. Each of these child statements may contain additional statements. An individual hierarchy of statements may be referred to as a statement path. One particular statement path is shown in FIG. 3A, the statement path: protocols-OSPF-area-interface-hello_interval (illustrated by using bold lines to show the path). The statements under the "interface" statement may be leaf statements, which do not contain other statements. Leaf statements may represent particular values or other data structures. The "hello-interval" statement, for example, may include a value that represents the length of the "hello" interval in seconds.

FIG. 3B is a diagram illustrating an exemplary interface 310 representing a portion of the configuration data shown in FIG. 3A. The representation in FIG. 3B may be a textual printout, such as a representation that may be presented to a user interacting with network device 200 through a command-line interface (CLI). Interface 310 may be displayed, for example, on a monitor of a client computing device, such as computing device 130, used to connect to network device 200.

Interface 310 represents the statement path shown in FIG. 3A. As shown, the statement path protocols-ospf-area includes an area number label "0.0.0.0". Contained by this area statement are the interfaces "so-0/0/0" and "so-0/0/1." Each interface statement may include values corresponding to the leaves of the interface statement. In this example, the leaf statement for the interface so-0/0/0 specifies the hello interval as 5 seconds and the leaf statement for the interface so-0/0/1 specifies the hello interval as 10 seconds.

In operation of network device 200, various users may modify the configuration information for network device 200. For example, a company that provides network services in network 110 (e.g., a service provider) may include a number of different departments that are each responsible for a different aspect of the control of network device 200. For instance, a network operation group may be responsible for the day-to-day operation of the network and a deployment group may be responsible for installing the network devices in the network. Different users within a group or users between different groups may make different configuration changes to network device 200. It is desirable for network device 200 to enforce permissions when making configuration changes in order to reduce the chance of a user inadvertently making changes to the network device.

Existing techniques, used by network devices, for enforcing permissions of configuration information, may include, for example, techniques in which each statement may have privilege categories associated with it. Users assigned to a privilege category that matches the statement may be allowed to modify the statement. Other existing techniques for enforcing permissions relating to configuration information may include fine grain techniques based on regular expressions, in which regular expressions may be used to set permissions for particular users or statements.

Figure 4:
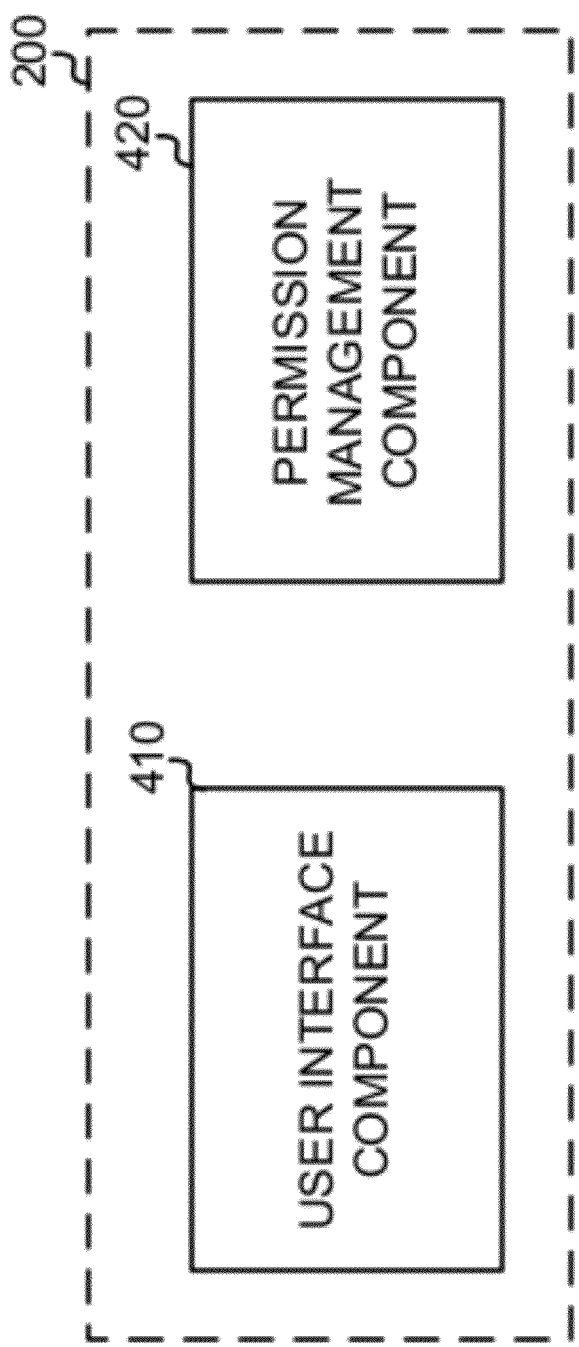
FIG. 4 is a diagram illustrating exemplary functional components of a network device relating to the management of configuration information.

FIG. 4 is a diagram illustrating exemplary functional components of network device 200 relating to the management of configuration information. In practice, the functional components shown in FIG. 4 may be implemented in software portion 220 of network device 200, such as part of network OS 225 or as a process that runs under network OS 225.

As shown in FIG. 4, network device 200 may include user interface component 410 and permission management component 420. User interface component 410 may provide an interface to users of network device 200, through which the users may view and modify the configuration information. In one implementation, user interface component 410 may present a CLI-based interface. Users may remotely connect to user interface component 410, such as via a telnet session or another remote connection protocol. Alternatively, users may connect locally to user interface component 410, such as through a port or other interface on network device 200. In response to a user request to view configuration information for network device 200, user interface component 410 may provide an interface, such as interface 310 (FIG. 3B), that presents configuration information for network device 200 to the user.

Permission management component 420 may store the permissions, relating to the configuration information, for network device 200. Permission management component 420 may additionally receive configuration changes from user interface component 410 and validate the changes to ensure that the configuration changes are allowed by the current permission settings. Consistent with aspects described herein, permissions stored by permission management component 420 and presented by user interface component 410 may be based on a permission tag used to mark statements as having restricted modification permissions. The permission tag may be displayed when the configuration information is presented to the user by user interface component 410.

Figure 5:
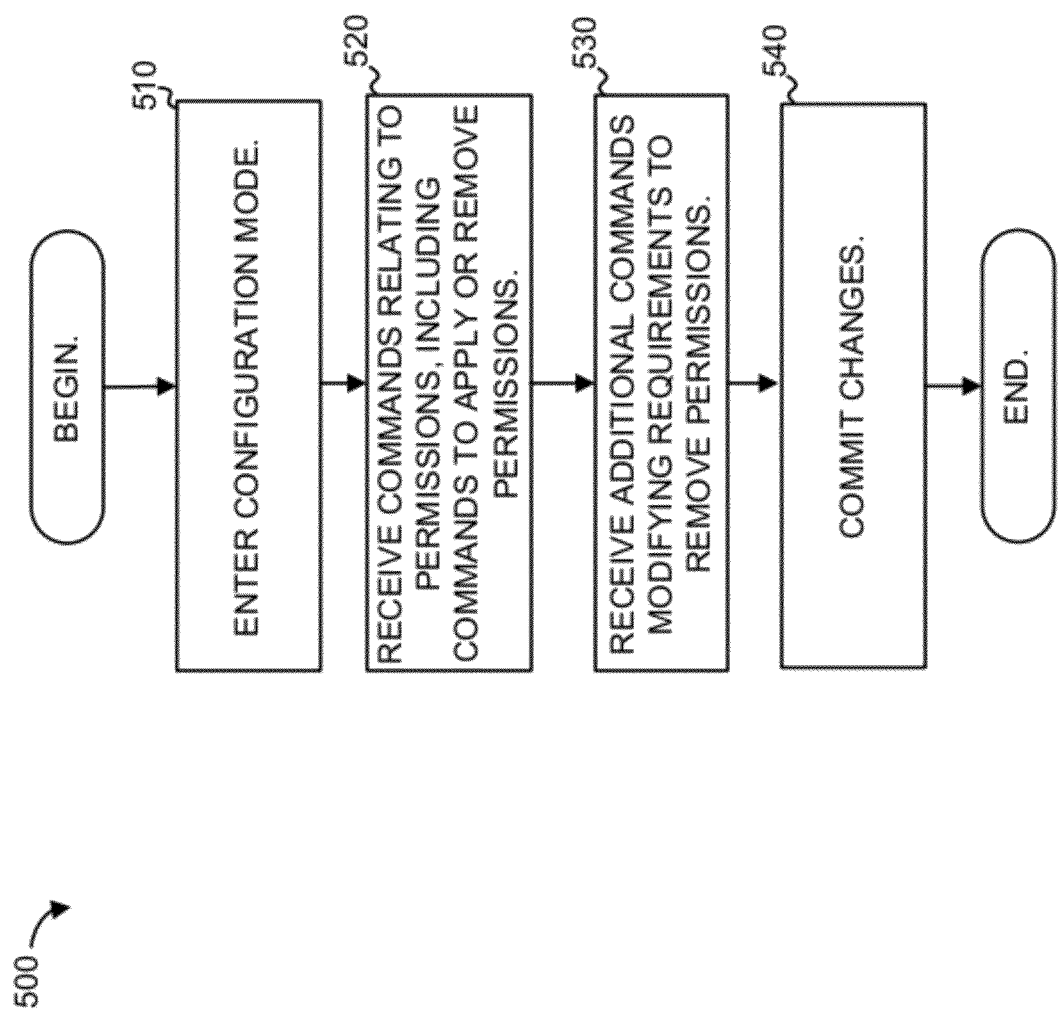
FIG. 5 is a flow chart illustrating an exemplary process for modifying the protection state for portions of the configuration information.

FIG. 5 is a flow chart illustrating an exemplary process 500 for modifying the protection state for portions of the configuration information. Process 500 may be performed by, for example, user interface component 410 in response to user commands entered through a CLI.

Network device 200 may be initially placed into configuration mode by the user (block 510). In one implementation, the CLI may have two operational modes: an operational mode designed to display and monitor the current status of network device 200 and a configuration mode. The configuration mode may be entered based on the user entering a command through the CLI. In the configuration mode, the user may define or modify properties of network device 200, such as interface properties, general routing information, routing protocols, user access, and/or system and hardware properties. Changes made in configuration mode may be initially made to a candidate configuration file. The candidate configuration file may not affect the operation of network device 200 until the candidate configuration file is committed.

User interface component 410 may receive commands from the user, including commands relating to permissions of the configuration information (block 520). The commands may particularly include commands to apply or remove permissions for a portion of the configuration information (block 520). For example, a permission tag may be applied or removed from a statement in the configuration hierarchy. As described herein, the permission tag may be the tag "protected," and the protected tag may be added with the "protect" command and removed with the "unprotect" command. It can be appreciated that other mechanism scan be used to represent these concepts.

Protected configuration information, such as protected statements, may initially be associated with a default set of users that are able to unprotect the protect statement. An additional command may be used to modify who is able to unprotect a protected statement (block 530). For example, permission management component 420 may implement an "apply-protect" statement that may be used to provide additional control over which users are able to unprotect a protected statement. The apply-protect statement may specify, for example, particular users that can remove the protect tag, a class of users, and/or any user that correctly enters a password. An example of an implementation of the apply-protect statement is described in more detail below.

A user may commit changes made in the configuration mode (block 540), such as the protect, unprotect, and apply-protect commands. In response, network device 200 may apply the changes and begin operation based on the applied changes.

Figure 6:
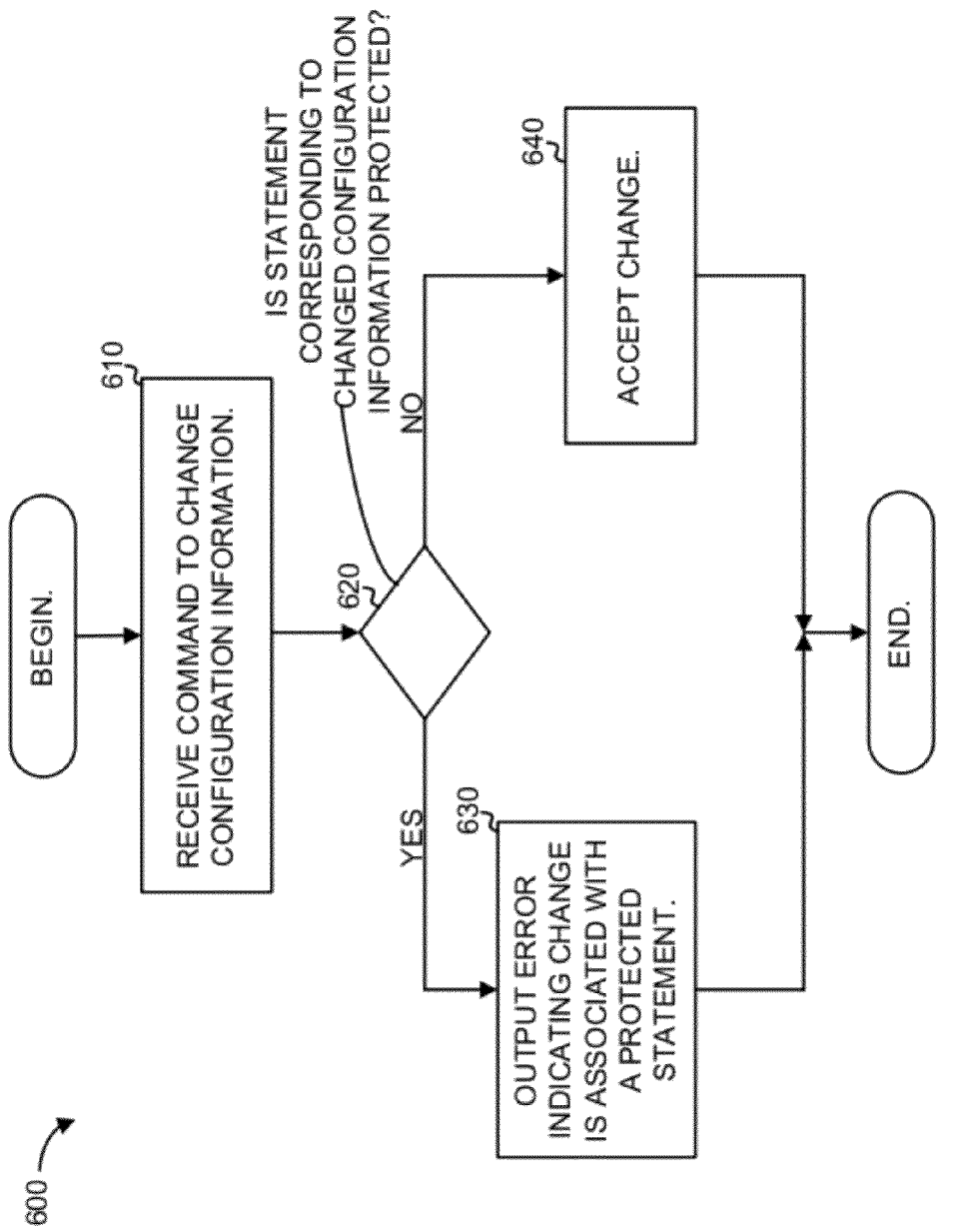
FIG. 6 is a flow chart illustrating an exemplary process for using permissions to control changes to the configuration information of a network device.

FIG. 6 is a flow chart illustrating an exemplary process 600 for using the permissions applied in process 500 to control changes to the configuration information of network device 200. Process 600 may be performed by, for example, permission management component 420 when a user attempts to change the configuration information for network device 200, either as the user enters the changes into the CLI or when the user attempts to commit the changes.

Process 600 may include receiving a command to change configuration information for network device 200 (block 610). For instance, a user may wish to change a parameter in the statement path shown in FIG. 3A, such as the "hello-interval" parameter. Permission management component 420 may determine whether the statement being changed corresponds to a protected statement (block 620), such as a statement associated with a "protected" tag. In one implementation, when a statement is associated with a protection statement, the statement and all statements below that statement in the statement path hierarchy may not be modified.

When the change corresponds to a protected statement, (block 620—YES), process 600 may output an error indicating the change is associated with a protected statement (block 630). In this situation, the modification corresponding to the protected statement may be denied (i.e., the modification fails). Alternatively, in some implementations, depending on the user class or privilege level, a warning may instead be output indicating the protected status of the statement. In another possible alternative implementation, when the user is entering configuration change commands in an interactive session, the user may be prompted to enter or other verification information before the modification is accepted. When the change does not correspond to a protected statement, (block 620—NO), process 600 may accept the change (block 640).

In alternative implementations, the operations shown in blocks 620-640 may be performed at different times. For example, error indications (block 630) may be output to the user immediately in response to a user entering a command to modify the configuration information. Alternatively, error information relating to configuration changes may be output only when the user attempts to commit changes. Further, in some environments, network device 200 may implement a "rollback" option in which a set of recent configuration changes may be undone to revert the network device to a state before the set of configuration changes was committed. Rollback operations that affect protected statements may also be processed as shown in FIG. 6.

As an example of the operation of a permission tag (e.g., a protected tag) applied to configuration information, consider the partial statement hierarchy shown in Table I, below. In Table I, a protected tag is added to a login statement. The user may have added the protected tag via a command such as "protect login," which may cause the protected tag to be applied to the login statement. The protected tag may be shown through the CLI using the text label "protected:" before the statement to which the protected tag applies. Operations that change the login statement (or statements below the login statement in the configuration hierarchy) may fail or trigger warning messages. Operations at higher levels in the configuration hierarchy, such as a rollback or "delete system" operation, may also fail or generate warnings as these operations attempt to modify the protected statement.

TABLE I

```
system {
    protected: login {
        message: "Don't tread on me";
        user phil {
            ....
        }
    }
}
```

When a user desires to make changes to a protected statement, the user may first remove the protected statement. For example, in the example shown in Table I, the user may enter a command such as "unprotect login" to remove the protected flag. At this point, the user may continue to make changes to the configuration information as desired. In one implementation, only users with appropriate permissions may remove a protected tag. For example, a user with a higher permission level than the user that created the permission tag may be able to unprotect the statement. Alternatively, an additional configuration tag may be applied to the configuration information to specify the requirements to remove the protection tag. As previously mentioned, the additional configuration tag may be an "apply-protect" that may be used to control which users can unprotect a protected configuration statement.

Consistent with aspects described herein, each apply-protect statement may be associated with one or more options that specify the permissions that must be met before permission management component 420 will remove the corresponding protection tag. In one implementation, the options for the apply-protect statement may specify, for example, particular users that can remove the protected tag, a class or classes of users that can remove the protected tag, and/or may specify that the user must enter a password to remove the protected flag.

A number of examples of the use of a protected tag with apply-protect statements are discussed below with reference to Tables II-IV.

Table II, below, illustrates a protected "system" statement and an associated apply-protect statement that specifies that only a particular user that supplies a particular password can remove the protected tag. In particular, the apply-protect statement may specify that only the user "phil" may unprotect the system statement and only when this user enters the correct password.

TABLE II

```
protected: system {
    apply-protect user phil encrypted-password
"$1$asfsdfsa";
    host-name foo;
    . . .
}
```

Table III, below, illustrates a protected "interfaces lo0" statement. Only users in the class "super-class" may unprotect this statement.

TABLE III

```
interfaces {
    protected: lo0 {
        apply-protect class super-user;
        unit 0 {
            . . .
        }
    }
}
```

Table IV, below, illustrates a protected "protocols bgp" statement. Any user with the proper password may unprotect this statement.

TABLE IV

```
protocols {
    protected: bgp {
        apply-protect encrypted password "$1$password";
        unit 0 {
            . . .
        }
    }
}
```

Another option that may be associated with the apply-protect command is a flag that may specify the behavior of user interface component 410 when changes are attempted for protected statements. As discussed previously, if a change is attempted to a protected statement, an error may be generated. Alternatively, the apply-protect command may include an option that causes user interface component 410 to automatically query the user to obtain the appropriate permissions to unprotect the statement. After the statement is modified, the statement may be automatically reset back to its previous protected state. In the implementation described below, this option may be implemented through an "automatic" flag that may be associated with an "apply-protect" command.

Table V, below, illustrates a protected "system" statement in which an "automatic" flag is used with the apply-protect command. The user "phil," with the proper password, may unprotect this statement. Because the "automatic" flag is used, the user may modify the "system" statement without having to separately "unprotect" the statement and then "protect" the statement when the modification is complete.

TABLE V

```
system {
    apply-protect automatic user phil password $1$abc;
    host-name foo;
}
```

Table VI, below, illustrates an exemplary interactive command-line session in which the system statement, protected by the apply-protect command, as shown in Table V, is modified. As shown in Table VI, when the user "phil" attempts to modify the system statement, a password prompt may be automatically generated. Assuming that the user enters the correct password, the system statement may be modified and the system statement may continue to be protected.

TABLE VI

```
cli# set system host-name foo
warning: [system] is protected
Enter password: XXXXX
```

As another example of the use of the automatic flag with the apply-lock command, consider the configuration information shown in Table VII. Here, the apply-lock command is used to protect the authentication information of a particular user. With this configuration information, only the particular user can change his password and the user's authentication information may be immutable to rollback. In other words, the user can set his own password but no one else can change it. Once the password is changed, it may be permanent, and other users cannot "rollback" away the password change.

TABLE VII

```
system {
    login {
        user phil {
            uid 1089;
            full-name "Phil S";
            authentication {
                apply-protect automatic user phil;
                encrypted-password "$1$asdfasdf";
                ssh-dsa ". . ..";
            }
        }
    }
}
```

CONCLUSION

As described above, configuration information for a network device may be protected from modification by associating a "protection" tag with configuration statements. Configuration statements that are associated with the protection tag may not be modifiable until a user removes the protection tag. The requirements for removing the protection tag may be based on one or more of specific users, specific user classes, or passwords. The permission technique described herein may provide good protection against unauthorized or inadvertent configuration changes as an explicit act is required to turn off protection.

The foregoing description of implementations provides illustration and description, but is not intended to be exhaustive or to limit the invention to the precise form disclosed. Modifications and variations are possible in light of the above teachings or may be acquired from practice of the invention.

For example, while series of acts have been described with regard to FIGS. 5 and 6, the order of the acts may be varied in other implementations consistent with the invention. Moreover, non-dependent acts may be implemented in parallel.

It will also be apparent that aspects described herein may be implemented in many different forms of software, firmware, and hardware in the implementations illustrated in the figures. The actual software code or specialized control hardware used to implement aspects described herein is not intended to limit the scope of the invention. Thus, the operation and behavior of the aspects were described without reference to the specific software code—it being understood that software and control hardware can be designed to implement the aspects based on the description herein.

Further, certain aspects described herein may be implemented as "logic" or as a "component" that performs one or more functions. This logic or component may include hardware, such as an application specific integrated circuit or a field programmable gate array, or a combination of hardware and software.

No element, act, or instruction used in the description of the invention should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A network device comprising:
   one or more processors to:
   display configuration information associated with the network device,
   the configuration information including a plurality of hierarchically arranged configuration statements,
   receive a first command to modify a particular configuration statement of the plurality of hierarchically arranged configuration statements,
   determine whether the particular configuration statement is associated with a permission tag,
   output, when the particular configuration statement is associated with the permission tag, an indication that the particular configuration statement is protected,
   receive a second command to remove the permission tag associated with the particular configuration statement,
   remove the permission tag based on the second command,
   modify the particular configuration statement based on the first command after the permission tag is removed, and
   reset protection of the particular configuration statement, by again associating the permission tag with the particular configuration statement, after modifying the particular configuration statement.

2. The network device of claim 1, where, when outputting the indication that the particular configuration statement is protected, the one or more processors are to:
   output a warning message describing a protected status of the particular configuration statement.

3. The network device of claim 1, where, when removing the permission tag, the one or more processors are to:
   determine that one or more conditions associated with the permission tag are satisfied, and
   remove the permission tag after determining that the one or more conditions are satisfied.

4. The network device of claim 3, where the one or more conditions are based on one or more of specific users, specific user classes, or passwords.

5. The network device of claim 1, where the one or more processors are further to:
   receive a third command before receiving the first command, and
   associate, based on the third command, the permission tag with the particular configuration statement.

6. The network device of claim 1, where the particular configuration statement includes information relating to one or more of interface properties, routing protocols, or user access of the network device.

7. The network device of claim 1, where the network device includes a router, a switch, or a network security device.

8. The network device of claim 1, where, when displaying the configuration information, the one or more processors are to:
   display a representation of the permission tag associated with the particular configuration.

9. A method comprising:
   receiving, by a network device, a first command to protect a particular configuration statement of one or more configuration statements associated with the network device;
   associating, by the network device and based on the first command, the particular configuration statement with a protected state;
   receiving, by the network device, a second command to modify the particular configuration statement;
   determining, by the network device and based on the second command, that the particular configuration statement is associated with the protected state;
   denying, by the network device and after determining that the particular configuration statement is associated with the protected state, modification of the particular configuration statement;
   receiving, by the network device, a third command to remove the protected state associated with the particular configuration statement;
   removing, by the network device and based on the third command, the protected state associated with the particular configuration statement;
   modifying, by the network device and based on the first command, the particular configuration statement after the protected state is removed, and
   resetting, by the network device and after modifying the particular configuration statement, protection of the particular configuration statement by again associating the particular configuration statement with the protected state.

10. The method of claim 9, where the one or more configuration statements are hierarchically arranged.

11. The method of claim 9, where, determining that the particular configuration statement is associated with the protected state includes:
   determining that the protected state is associated with the particular configuration statement or with a configuration statement that is above the particular configuration statement in a hierarchy of the one or more configuration statements.

12. The method of claim 9, where removing the protected state associated with the particular configuration statement includes;
verifying that one or more conditions are satisfied to remove the protected state based on one or more of information associated with a user of the network device, a class of the user, or a password provided by the user, and
removing the protected state after verifying that the one or more conditions are satisfied.

13. The method of claim 9, further comprising:
outputting, after determining that the configuration statement is associated with the protected state, a message indicating that the particular configuration statement is protected.

14. The method of claim 9, where the one or more configuration statements include information relating to interface properties, routing protocols, or user access of the network device.

15. The method of claim 9, further comprising:
presenting the one or more configuration statements in a text-based command line interface (CLI),
the CLI including a label to represent that the particular configuration statement is associated with the protected state.

16. The method of claim 9, where removing the protected state includes:
determining a first permission level of a first user who provided the first command to the network device,
determining a second permission level of a second user who provided the second command to the network device, and
determining that the second permission level is higher than the first permission level, and
removing the protected state after determining that the second permission level is higher than the first permission level.

17. A network device comprising:
a processor to:
receive a first command to associate a configuration statement with a protected state that indicates that the configuration statement is protected,
associate based on the first command, the configuration statement with the protected state;
receive a second command to modify the configuration statement;
deny, based on the second command, modification to the configuration statement when the configuration statement is associated with the protected state;
receive a third command to remove the protected state associated with the configuration statement;
remove, based on the third command, the protected state associated with the configuration statement, and
modify the configuration statement, based on the second command, after removing the protected state, and
re-associate the configuration statement with the protected state after modifying the particular configuration statement.

18. The network device of claim 17, where the configuration information is hierarchically arranged in relation to other configuration statements associated with the network device.

19. The network device of claim 17, where the protected state is represented by a text-based permission tag within configuration information that includes the configuration statement.

20. The network device of claim 17, where associating the configuration statement with the protected state includes storing one or more conditions that need to be met before the protected state is removed based on the second command.

21. The network device of claim 20, where the one or more conditions are based on one or more of information associated with a user of the network device, a class of the user, or a password provided by the user.

22. The network device of claim 17, where the processor is further to:
present the configuration statement to a user in a text-based command line interface (CLI),
the CLI including a label to represent that the configuration statement is associated with the protected state.

23. The network device of claim 17, where, when removing the protected state, the processor is to:
provide a name of a particular user who is allowed to remove the protected state,
receive a password from the particular user,
determine that the received password matches a correct password associated with the protected state, and
remove the protected state after determining that the received password matches the correct password.

24. A method comprising:
receiving, by a device, a first command to modify a particular configuration statement of the plurality of configuration statements of the device;
determining, by the device, whether the particular configuration statement is associated with a permission tag;
denying, by the device and when the one of the plurality of configuration statement is associated with the permission tag, modification of the particular configuration statement;
receiving, by the device, a second command to remove the permission tag associated with the particular configuration statement;
removing, by the device and based on the second command, the permission tag based on the second command;
modifying, by the device and based on the first command, the particular configuration statement after the permission tag is removed, and
resetting, by the device and after modifying the particular configuration statement, protection of the particular configuration statement by again associating the particular configuration statement with the permission tag.

* * * * *